United States Patent [19]

Tellman et al.

[11] Patent Number: 4,655,869

[45] Date of Patent: Apr. 7, 1987

[54] METHOD AND APPARATUS FOR MAKING EXPANDED WOOD VENEER PRODUCTS

[76] Inventors: Stephen J. Tellman, Bullet Hole Rd., Patterson, N.Y. 12563; Oscar Selber, 8 Collier Dr. W., Carmel, N.Y. 10512

[21] Appl. No.: 457,008

[22] Filed: Jan. 10, 1983

Related U.S. Application Data

[63] Continuation of Ser. No. 358,708, Mar. 16, 1982, abandoned, which is a continuation of Ser. No. 176,280, Aug. 8, 1980, abandoned.

[51] Int. Cl.⁴ .............................................. B32B 31/18

[52] U.S. Cl. .................................... 156/252; 156/256; 156/510; 144/2 R; 144/2 J; 144/2 K; 144/345; 144/350; 144/363

[58] Field of Search ............... 156/197, 252, 253, 256, 156/257, 261, 263, 264, 265, 268, 510, 517; 144/309 Q, 314 R, 315 R, 317, 309 R, 302 R, 2 J, 2 K, 196, 197, 319, 2 R, 345, 350, 363; 428/106, 114, 166, 189, 304, 316, 322

[56] References Cited

U.S. PATENT DOCUMENTS 2,737,214 3/1956 Elmendorff ......................... 144/2 R
2,815,779 12/1957 Higgins ............................... 144/309
2,815,780 12/1957 Higgins ............................... 144/309
2,974,697 3/1961 Elmendorff ..................... 144/320 R
3,678,974 7/1972 O'Brien ............................... 144/2 R
4,137,956 2/1979 Toberg ................................. 144/2 J

*Primary Examiner*—Caleb Weston
*Attorney, Agent, or Firm*—Evelyn M. Sommer

[57] ABSTRACT

A unitary sheet of plywood comprising at least one layer of plywood veneer expanded in a direction perpendicular to the grain and at least one layer of plywood veneer bonded to said expanded layer; the method of forming such plywood comprising forming a first layer or layers of plywood veneer expanded in a direction perpendicular to the grain and bonding at least one layer of plywood veneer to said expanded layers, the method of forming expanded veneer comprising incising a strip of green veneer with at least one multi-bladed nip roller to cause an expansion thereof in a direction perpendicular to the grain and drying said incised strip, and apparatus for expanding a sheet of green veneer comprising at least one multi-bladed roller for incising a sheet of green veneer to cause expansion thereof in a direction perpendicular to the grain and means for drying said incised veneer sheet.

9 Claims, 7 Drawing Figures

METHOD AND APPARATUS FOR MAKING EXPANDED WOOD VENEER PRODUCTS

This is a continuation of application Ser. No. 358,708, filed Mar. 16, 1982, abandoned, which in turn is a continuation of Ser. No. 176,280, filed Aug. 8, 1980 abandoned.

The present invention relates to a plywood utilizing expanded veneer, a method of forming plywood constructions utilizing expanded veneer, and a method and apparatus for forming expanded veneer.

It has long been known that plywood for structural applications can be made from a variety of different wood species having widely varying strengths and densities. In fact, criteria for utilizing veneers of different strengths and densities in plywood constructions are spelled out in U.S. Product Standard PS 1-74. It is common practice in the plywood industry to use veneers from strong wood species for face and back plies and weaker, lower grade and/or lower density veneers for the inner plies. Thus an "I-beam" configuration is created where the strong flanges (face and back veneers) withstand the major tensile and compressive forces in bending while the web (inner plies) withstand mostly shear and compressive forces. However, in some parts of the country, such as the Southeast, strong wood species are much more abundant than weaker species with the result that most plywood is being made stronger than it really needs to be for most applications. Strong veneers are being used for all plies instead of just face and back plies.

In order to reduce costs it has been desired to reduce the amount of wood in the plywood innerplies, but still retain enough strength and other desired properties to ensure the plywood will maintain its general utility. In the past, there has been little incentive to maximize veneer yield in plywood constructions due to the relatively low cost of wood. Today, wood costs are much higher and the need to maximize yield is pressing.

SUMMARY OF THE INVENTION

The present invention provides novel plywood utilizing a reduced amount of veneer and having adequate structural and physical properties for most sheathing applications. This invention also provides the method for making such plywood in a commercially viable manner.

Briefly, the invention comprises a unitary plywood sheet comprising a first layer of wood veneer expanded in a direction perpendicular to the grain and at least one layer of wood veneer bonded to said expanded layer to form a unitary sheet of plywood and to the method of forming such plywood.

The invention also relates to a method and apparatus for expanding a sheet of green veneer in a direction perpendicular to the grain without also reducing the thickness appreciably comprising at least one bladed nip roller for incising said sheet of green veneer to cause an expansion thereof in a direction perpendicular to the grain and means for drying said incised green veneer strip.

BRIEF DESCRIPTION OF THE DRAWINGS

Other objects, advantages and features of the present invention will become apparent from the following detailed description, which, taken in conjunction with attached drawings, discloses preferred embodiments of the present invention and in which.

DETAILED DESCRIPTION OF THE DRAWINGS

Figure 1:
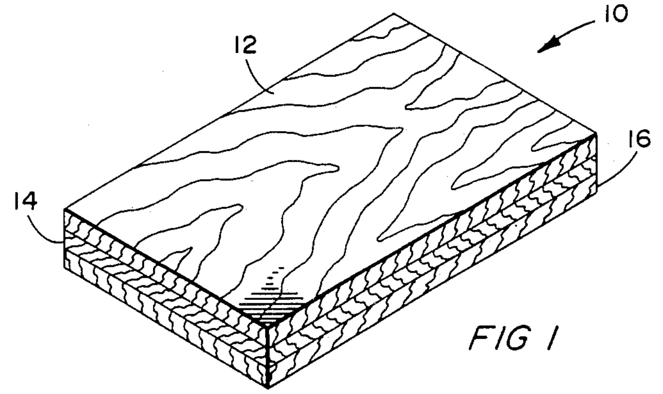
FIG. 1 is an isometric view of a prior art plywood.

Plywood veneer can be made from a variety of different wood species having widely varying strengths and densities. FIG. 1 is an isometric view of a unitary sheet of plywood 10 which is formed of a first sheet of veneer forming an outer layer 12, a second sheet of veneer forming an inner layer or ply 14 and a second outer layer or sheet of veneer 16 bonded together. Because the costs of different wood varies depending upon the type of wood, it is old in the prior art to utilize an inner ply or layer 14 formed of less strong or less expensive wood species, and to utilize more expensive or stronger wood species to form the outer layers 12 and 16.

However, in some parts of the country, such as the Southeast, strong wood species are much more abundant than weaker species with the result that most plywood formed in that area is being made with the outer layers and the one or more intermediate layers formed from the strong species, and thus the plywood is being made stronger than it really needs to be for most applications. When plywood is composed entirely of strong wood, it has been found that some of the wood can be removed from the innerplies without destroying the utility of the plywood. An effective way to remove wood from the innerplies is to expand the veneer in the perpendicular-to-the-grain direction.

Figure 2:
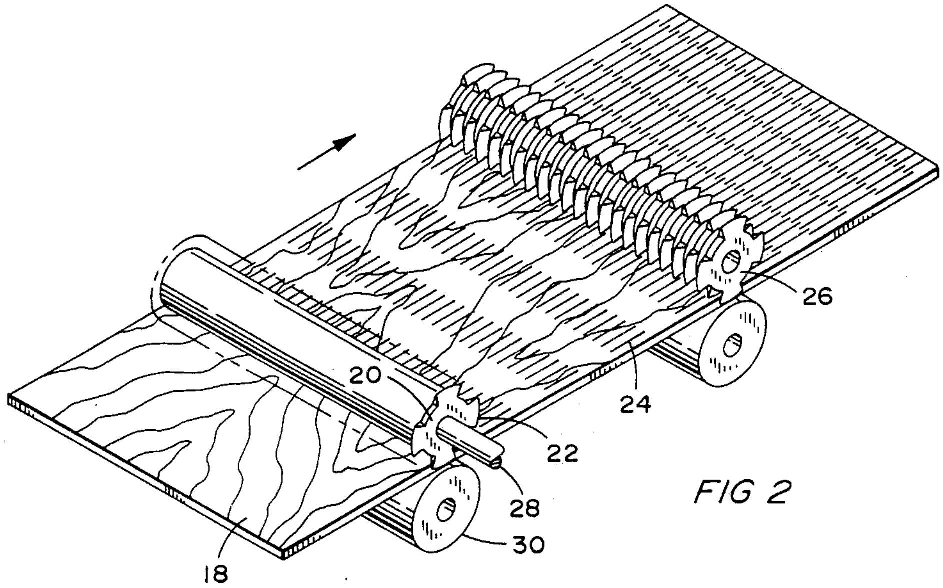
FIG. 2 is a diagrammatic representation of a sheet of veneer passing through a bladed, nip roller for incising said sheet to cause an expansion thereof.

Thus, as can be seen in FIG. 2, sheets or strips of green veneer 18 are run through at least one nip roller 20 having blades 22 thereon which wedge the wood apart in small increments perpendicular to the grain. Thus the veneer panel 18 emerges from the process expanded in a direction perpendicular to the grain as indicated at 24 and somewhat macerated. The amount of expansion achieved varies with the configuration of the bladed rolls 20 and the number of rolls 20 through which the veneer panel 18 is passed. A 35% to 40% expansion (after drying) appears to be a practical limit for most veneer since expansion in excess of this amount produces veneer too weak for most structural applications. If desired, further nip rollers 26 can be used through which the veneer sheet 18 passes, thereby forming a series of rollers to achieve the desired amount of expansion of the veneer sheet 18. There must be expansion of the veneer in a direction perpendicular to the grain without also reducing its thickness appreciably. The veneer is broken or wedged apart in small increments across the width of the sheet as shown in FIG. 2, but is not broken so much that the veneer sheet 18 will not remain intact as a unitary layer through later steps in the manufacture of the plywood. It is important in expanding veneer not to damage parallel-to-the-grain stength any more than absolutely necessary to obtain the necessary expansion. It is also important that a small amount of wood be crushed at each point where the veneer is wedged apart. This crushed wood acts as a permanent wedge to keep the veneer in the expanded condition after the blade is withdrawn. Use of dull knife blades ensures that some crushing will be achieved. Both dry and green veneer can be expanded, but green veneer is the preferred material because the wood fibers hold together after expansion much better than the dried veneer and less damage is done to the veneer in the expanding process.

Expansion of green veneer provides a number of advantages such as faster drying, better dimensional stability across the grain, fewer problems in the veneer dryer because the veneer will lay flatter and stay flatter during drying, reduced shrinkage in drying, more uniform drying, the ability to use significantly lower pressures in the hot press due to the greater compressability of the expanded veneer, and lighter weight which has the advantage of lower shipping costs and easier handling of the plywood on the job site. In short, there are significant savings in processing costs. However, the primary advantage is the increased yield of veneer. Expansions in excess of 40% have been obtained, but at these high expansions there is considerable penalty in strength lost parallel as well as perpendicular to the grain.

Figure 3:
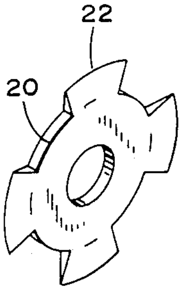
FIG. 3 is a side view of one of the incising blades used in the expander shown in FIG. 2.

The expander shown in FIG. 2 incorporates a roll 20 comprised of a number of sharpened segmental discs about 1/16th inch thick. These discs are mounted on a steel shaft 28 with no spacers between them. The shaft 28 with discs 20 thereon is opposed with a solid steel roll or smooth roll 30 such that when veneer is fed into the nip between the rolls, it gets wedged apart every one-sixteenth inch by the blades 22. The veneer sheet 18 may be run through this nip up to four times on each side to achieve expansions of 30% to 40% after drying compared with an unexpanded sheet. Similar amounts of expansion can be obtained by running the veneer through wider spaced discs with more sets of disc rollers, or other devices to expand the veneer. The disc 20 is shown in FIG. 3 in detail. Blades 22 have a slightly sharpened edge and a broad base in order to wedge the veneer apart.

It has been found that veneer expanded in this manner as much as 30% to 40% can still be readily handled without excessive breakage. It can be spread with glue satisfactorily with a glue spreader and can be pressed satisfactorily in the plywood press, but requires lower pressures than with unexpanded veneers.

Figure 4:
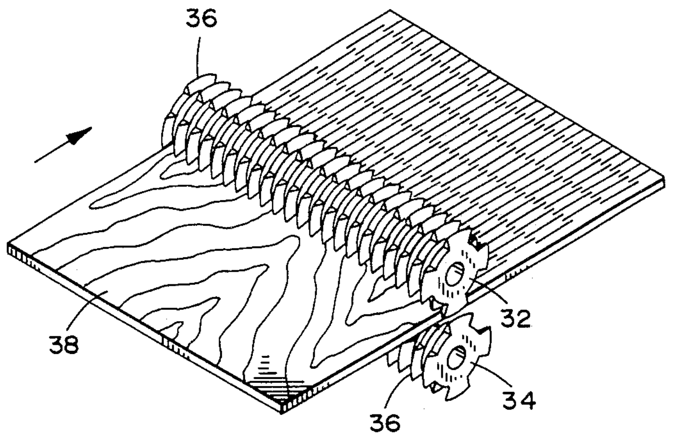
FIG. 4 is a diagrammatic representation of an alternate embodiment of the present invention in which the sheet of veneer is incised on both sides by a nip roller having blades that intermesh.

FIG. 4 discloses an alternate embodiment of the expander shown in FIG. 2 in which both of the nip rollers 32 and 34 have discs with blades 36 thereon which mesh with each other, thus allowing the veneer sheet 38 to be pierced or incised from both sides. This allows the expansion to take place in a shorter time. Again, of course, a series of such nip rollers such as 32 and 34 could also be used.

Figure 6:
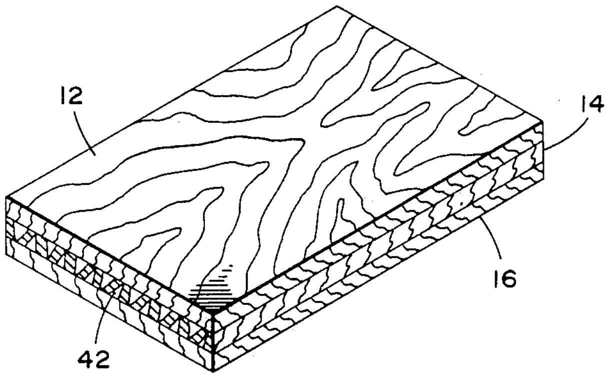
FIG. 6 is a diagrammatic representation of a sheet of plywood which has been formed by the novel method of the present invention.

After the veneer sheet 18 in FIG. 2 or veneer sheet 38 in FIG. 4 has been expanded to the desired size, it is then taken to a dryer where it is dried in the conventional manner. The dried, expanded veneer can then be used as the intermediate (inner) ply 14 which is sandwiched between the two outer veneer sheets 12 and 16 as shown in FIG. 1. Because the inner ply 14 is made of the expanded veneer, the plywood end product is lighter and a greater volume of plywood can be produced from a given amount of veneer. As can be see in FIG. 6, the expanded veneer 14 which is used as the inner layer or ply, may be placed between the outer layers 12 and 16 with its grain parallel with, or perpendicular to, the grain of the outer layers 12 and 16. Thus the holes 40 (shown as wedge-shaped for the purpose of illustration) which are parallel to the grain of the expanded panel 14 may extend in a direction transverse to the grain of outer panels 12 and 16 or if desired, as indicated at 42, may run parallel to the grain.

It has also been found that the expanded veneer product can be made by incising and expanding the green (or wet) veneer and platen drying it simultaneously while it is in the expanded state. The end result is a piece of flat, dry veneer which contains multiple holes corresponding to the incising blades used to expand the veneer. The amount of expansion obtained, again, is a function of the number, thickness, and spacing of the incising blades used to expand the veneer. The appearance of the dry veneer after undergoing this type of expansion physically resembles expanded sheet metal to some degree. The veneer is distorted around the incising blades and dried in that condition which "locks in" the distortion more or less permanently. The perforated, expanded veneer so produced with incising blades on a platen exhibits better strength retention and more consistent expansion than veneer run through multiple passes of the incising blades on the nip rollers as described in relation to FIGS. 2 and 4. In addition, further benefits are obtained with the use of the platen drying system. Platen drying (or contact drying), is known to be a very rapid, efficient way to dry veneer with the additional benefits of producing very flat veneer out of the dryer, less veneer loss in drying due to cracking, more uniform drying throughout the veneer sheet and reduced shrinkage across the grain. Further, in the present system, the rate of drying is further increased by virtue of the numerous incising blades penetrating the veneer during the platen drying. Furthermore the expanding action of the blades "opens up" the veneer so much that the venting of steam produced in drying is greatly facilitated. Expanded veneer produced by this or any other technique is best suited for core veneer in plywood sheathing and other plywood products where the effects of the expanded veneer do not adversely impact the appearance and utility of the product.

Figure 5A:
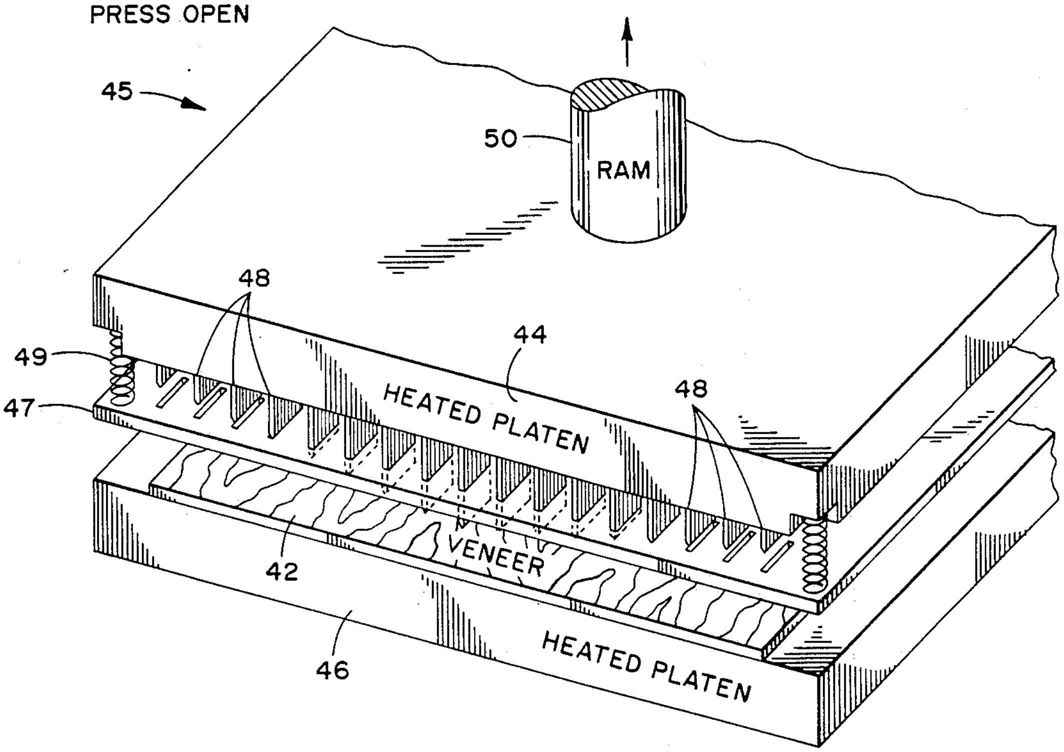
FIGS. 5(*a*) and (*b*) are diagrammatic representations of an alternate embodiment of the present invention in which a sheet of veneer is placed between and incised by blades on heated platens which simultaneously dry the green veneer sheet.
Figure 5B:
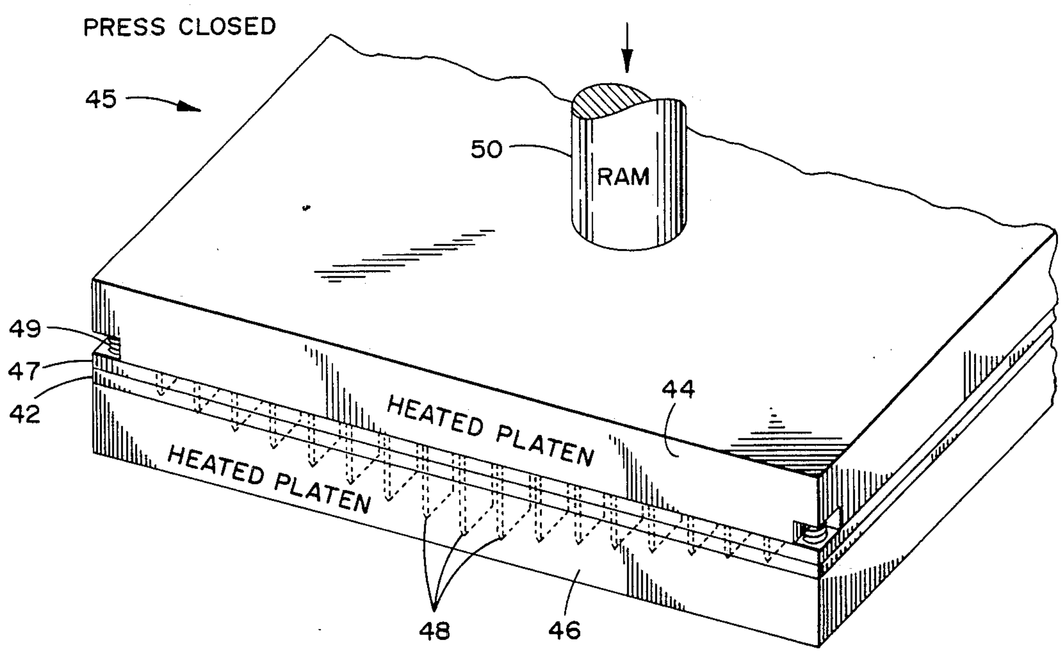

Thus as can be seen from FIGS. 5(*a*) and 5(*b*), a sheet of green veneer 42 is placed on the bottom heated platen of a hot press 45. As the hot press closes, knife blades 48 protruding from the heated top platen 44 pass through the veneer and into slots in the bottom heated platen 46. The knives are longest at the center of the platen. This knife arrangement ensures that the veneer will be able to expand outward as each subsequent set of knives enters it. The stripper plate 47 pushes the veneer off of the knives as the press opens, via strong springs 49 that are compressed when the press closes.

As can be seen in FIG. 3, the blades used with nip roller 20 in FIG. 2 are configured to expand the green veneer in a direction perpendicular to the grain.

The following Table compares the strengths of one-half inch, four ply, southern pine plywood made without expanded inner plies; one-half inch, four ply, southern pine plywood with inner plies expanded 22%; and one-half inch, four ply, white fir plywood.

TABLE

| | MOE* | MOR* | MOE** | MOR** |
|---|---|---|---|---|
| ½" 4-ply southern pine plywood | 293,800 psi | 5,338 psi | 1,444,333 psi | 11,846 psi |
| ½" 4-ply southern pine plywood with inner plies expanded 22% | 186,233 psi | 3,457 psi | 1,044,566 psi | 10,223 psi |
| ½" 4-ply white fir plywood | 186,283 psi | 2,454 psi | 920,533 psi | 6,180 psi |

Note:
*refers to perpendicular-to-grain of face veneer
**refers to parallel-to-grain of face veneer Thus, the modulus of elasticity (MOE) and modulus of rupture (MOR) for southern pine with expanded inner plies is considerably less than southern pine without the expanded inner plies in both the directions perpendicular to the grain and parallel to the grain. However, the strength of southern pine with expanded inner plies is still greater than the strength of plywood made from unexpanded white fir (white fir is a weaker species than southern pine).

Although these data show that the use of expanded veneer inner plies significantly reduces the bending strength and stiffness of southern pine plywood, it is also evident that these reductions in strength and stiffness are not as great as would be incurred if the plywood were made entirely of a weaker wood such as white fir. It can be seen, then, that southern pine plywood can be made with expanded veneer without destroying its utility for many applications.

Thus, there has been disclosed a novel plywood construction which has an inner ply or plies formed of expanded veneer allowing the use of a strong wood species at a reduced cost because of the increased yield due to the expansion. Further, the resultant plywood is lighter-than-normal because of the expanded inner ply or plies.

It is also contemplated in the present invention that plywood products can be made where the expanded veneer forms one or more of the outer plies, as in certain uses where appearance is not important.

While the advantageous embodiments have been chosen to illustrate the invention, it will be understood by those skilled in the art that various changes and modifications can be made therein without departing from the scope of the invention as defined in the appended claims.

What is claimed is:

1. A method of forming an expanded sheet of wood veneer, said method comprising the steps of:
   (a) providing a sheet of wood veneer;
   (b) providing cutting means having a plurality of cutting blades thereon; and
   (c) forming a plurality of initial finite incisions in said veneer with said cutting means, said incisions extending completely through the entire thickness of said veneer and being elongated in in the general direction of the grain of said veneer, and subsequently continuing progressively in the cross grain direction of said veneer to form additional similar incisions whereby said veneer is free to expand in the cross grain direction until substantially the entirety of said veneer has been incised.

2. The method of claim 1, further comprising the step of crushing a small amount of wood at ends of said incisions during the forming of said incisions to permanently wedge said incisions laterally open.

3. The method of claim 2, wherein said wood veneer is a green wood veneer, and further comprising the step of drying said veneer after the latter has been completely incised 4. An apparatus for incising wood veneer sheets to produce cross grain expansion of the sheets, said apparatus comprising:
   (a) first and second opposed platen;
   (b) a plurality of incising blades mounted on one of said platen and projecting toward the other of said platen, said blades being arranged in a preset pattern, with the blades in one portion of said platen having a longer axial dimension than the blades on adjacent portions of said platen flanking said one portion;
   (c) the other of said platen having a plurality of recesses for telescopingly receiving said incising blades; and
   (d) ram means for moving one of said platen toward the other whereby said incising blades will form a predetermined pattern of through incisions in a wood veneer sheet positioned between said platen, and said incising blades will enter said recesses.

5. The apparatus of claim 4, further comprising means for heating said platen to dry a veneer disposed between said platen after incisement of said sheet.

6. An apparatus for incising wood veneer sheets to produce cross grain expansion of said sheets, said apparatus comprising:
   (a) an elongated first platen having an array of blades projecting therefrom, said blades being aligned generally parallel to the longitudinal axis of said first platen, with the projecting length of the blades progressively decreasing with the respective distances of said blades from the longitudinal axis of said first platen;
   (b) a second platen having an array of recesses conforming to said array of blades for telescopingly receiving said blades;
   (c) ram means for moving one of said platens toward the other said platens; and
   (d) means for heating said apparatus, whereby when said sheet is placed on said secon platen with the grain thereof aligned generally parellel to the recesses, movement of said platens toward one another by said ram means causes said blades to progressively incise and expand said sheet in the cross grain direction, and whereby the means for heating said sheet in its expanded condition.

7. An apparatus as in claim 6 further including a means for separating said blades from said sheet.

8. An apparatus as in claim 7 wherein said means for separating said blades from said sheet comprises a stripper plate disposed adjacent said first platen and including a plurality of apertures aligned with said blades, and at least one spring connecting said stripper plate to said first platen and biasing said stripper plate away from said first platen, whereby when said first platen is moved away from the incised veneer sheet, said spring will urge said stripper plate away from said first platen thereby separating said veneer sheet from said blades.

9. A method for forming an expanded sheet of wood veneer, said method comprising the steps of:

providing a sheet of green wood veneer;

providing a first platen having a plurality of substantially parallel knife blades extending from one surface thereof;

providing a second platen having a plurality of substantially parallel slots extending into one surface thereof, said slots being dimensioned and located to receive said blades when said platens are moved toward one another;

placing said sheet of green wood veneer on said second platen such that the grain of said sheet is aligned generally parallel to said slots;

moving said first platen toward the second platen such that said knife blades pass through said sheet and into the slots a sufficient distance to cause said first platen to be in face-to-face contact with said sheet, said knife blades passing through said sheet progressively in the cross grain direction from the longitudinal axis of said veneer towards the opposite edges thereof, such that said sheet is free to expand in the cross grain direction until substantially the entirety of said veneer has been incised;

applying heat to said first and second platens to dry said sheet;

separating said first platen from said sheet; and removing said sheet from said second platen.

* * * * *